United States Patent [19]

Klein

[11] Patent Number: 5,371,889

[45] Date of Patent: Dec. 6, 1994

[54] JOURNALLING OPTIMIZATION SYSTEM AND METHOD FOR DISTRIBUTED COMPUTATIONS

[75] Inventor: Johannes Klein, San Francisco, Calif.

[73] Assignee: Digital Equipment Corporation, Maynard, Mass.

[21] Appl. No.: 51,523

[22] Filed: Apr. 22, 1993

[51] Int. Cl.$^5$ .......................... G06F 15/16; G06F 9/40
[52] U.S. Cl. .............................. 395/650; 364/DIG. 1; 364/285; 364/285.1; 364/285.2; 364/285.3
[58] Field of Search ................. 395/650; 364/DIG. 1, 364/285, 285.1, 285.2, 285.3

[56] References Cited

U.S. PATENT DOCUMENTS

| | | | |
|---|---|---|---|
| 5,086,386 | 2/1992 | Islam | 395/600 |
| 5,157,779 | 10/1992 | Washburn et al. | 395/575 |
| 5,214,780 | 5/1993 | Ingoglin et al. | 395/600 |

Primary Examiner—Kevin A. Kriess
Assistant Examiner—A. Katbab
Attorney, Agent, or Firm—Albert P. Cefalo; Barry N. Young

[57] ABSTRACT

A protocol analysis system is provided with data specifying the defined states of processes participating in a distributed computation. State transitions between states are specified as being enabled by (A) receiving a message, (B) unreliably sending a message, or (C) performing an external action such as reliably sending a message. The specification data also identifies process states known to be final states, and all other states are initially denoted as intermediate states. The protocol analysis system determines if any intermediate states can be re-categorized as final states. Then it determines if any state transitions initially identified as unreliable send operations must be treated as derived external actions, and thus made reliable. Thirdly, for each derived external action, the states of the affected application process must be re-evaluated so as to determine if derived final states need to be converted into intermediate states. The resulting determinations as to which states are final states and which messages must be reliable sent are recorded and used to govern execution of the application process. When executing the application process, state transitions entering and leaving intermediate states are normally recorded on stable storage before the state transition is carried out and reliably sent messages are normally recorded on stable storage before being sent. A number of run-time journal optimization techniques reduce the number of state transitions and messages that need to be stored on stable storage.

12 Claims, 9 Drawing Sheets

State Machine Table
┌─112

| State | State Type | Next State | Msg To/From | External Action ? | Transition Criteria |
|---|---|---|---|---|---|
| FSM 1 | | | | | |
| S1 | I | S2 | FSM 2 | Y | Receive External Msg 1 |
|  |  | S3 | FSM 3 | Y | Receive External Msg 2 |
| S2 | F | | | | |
| S3 | I | S4 | DEV A | N | Receive Msg 3 |
| S4 | I | S5 | FSM 2 | Y | Send Reliable External Msg 4 |
| S5 | I | S6 | FSM 3 | N | Send Msg 5 |
| S6 | F | | | | |
| FSM 2 | | | | | |

TWO-PHASE COMMIT PROTOCOL

PRESUMED COMMIT VERSION OF TWO-PHASE COMMIT PROTOCOL

PRESUMED ABORT VERSION OF TWO-PHASE COMMIT PROTOCOL

JOURNALLING OPTIMIZATION SYSTEM AND METHOD FOR DISTRIBUTED COMPUTATIONS

The present invention relates generally to distributed processing computer systems in which a distributed application is performed by multiple processes that coordinate their computations by exchanging messages. More particularly, the present invention relates to a system and method for automatically determining which states of each process in a distributed application must be journalled in order to ensure recovery of the distributed application from system failures at any point in time.

BACKGROUND OF THE INVENTION

Referring to FIG. 1, the present invention concerns interactions and interdependencies of agents 102-1 through 102-N cooperating in a distributed processing computer system 100. Depending on the operating system used, each agent 102 may be a thread or process, and thus is a unit that executes a computation or program. Some of the agents 102-1 through 102-N may be executing on one data processing unit while others are executing at remote sites on other data processing units. More generally, agents can be hosted on different computer systems using different operating systems.

In addition to application processes executed by agents 102, the distributed system 100 also includes "external" devices 104 (i.e., external to the agents 102) with which messages are exchanged, journal processes 106 that record state information on stable, non-volatile, storage 108, and at least one restart manager process 109 that restarts other processes in the system after a failure. Application processes use journal services to record state information on stable storage. To further protect from failures, journal processes 106 often store data on two or more non-volatile storage media to compensate for the unreliability of storage devices such as magnetic disks. Typically, data written to a journal service is recorded on stable storage in the order received, and the data stored on stable storage cannot be modified, making write operations to stable storage irrevocable operations.

In this document the terms "journal," "journal process" and "journalling process" are used interchangeably. All refer to a process for storing information on stable storage to enable consistent recovery and completion of a distributed computation after a failure of the computer system, a part of the computer system, or any process running on that computer system.

The restart manager process 109 is used when a computer system is powered on or reset after a system failure. It uses information stored on stable storage 108 to determine the state in which each application process 102 is to be restarted. A communications path or bus 110 interconnects the various processes 102, 108, 109 and devices 104 in the system 100.

Each agent's application program is, in the context of the present invention, considered to be a finite state machine which progresses through a sequence of internal states. Complex computations are mapped into simpler sets of states suitable for synchronization with other computations.

Application processes execute user-defined programs and synchronize their execution by exchanging messages. In any particular application process, a set of protocols defines the types of messages sent, as well as the applicable constraints thereon—i.e., the circumstances under which each message type is to be sent and/or received. Such constraints define order and coexistence requirements between messages.

Computer processes can fail due to software errors or hardware failures. Failures can cause messages and process state information stored in a computer's volatile memory to be corrupted, lost, or otherwise unusable. However, state information recorded on external devices such as disks, terminals, etc. remain in existence independent of process failures. As a result, state transitions are called external actions if they cause information to be recorded on external devices.

If state information has been recorded on external devices, execution of an agent may have to continue after a process or system failure if the computation being performed by the agent was interrupted and the agent has not already entered a final state. To continue processing and consistently complete protocols in the presence of failures, the "process state" of each agent typically needs to be stored on stable (nonvolatile) storage. To compensate for lost messages and to ensure protocol termination, a message may need to be recorded on stable storage and sent repeatedly until received.

It is a premise of the present invention, as well as a premise of most distributed computer processing systems, that processes have to continue or resume execution even after a failure if resources are left in an intermediate state. Such situations arise when processes are interrupted while performing multiple related external actions such as dispensing money at a teller machine, updating secondary storage, or setting machinery. Premature termination of such processes would potentially leave devices in an intermediate, usually inconsistent state, cause machinery to be blocked, allow money to be withdrawn incorrectly, or cause other kinds of inconsistencies. Extensive studies of these types of scenarios have been made in the area of transaction processing systems and database systems.

To ensure that an interrupted process can continue execution, it is common practice to use a "journalling process" to store state information regarding each intermediate state of each constituent process. The problem addressed by the present invention concerns the high cost of journalling state information for the intermediate states of an application process. In particular, each journalling operation uses scarce system resources, and also slows down the progress of the application process because of the requirement that state information be stored on stable storage before the actions associated with a subsequent state transition are performed.

It has been recognized in the past that many protocols can be modified so as to reduce the associated journalling requirements. For instance, there are a number of variations on the so-called "two phase commit" protocol used in transaction processing, designed to avoid journalling one or more states that would otherwise have been considered to require such journalling. For systems handling millions of transactions, avoiding one journalling step per transaction is a significant savings.

In the past, such adjustments to protocols to avoid journalling have been performed manually on an ad hoc basis. The present invention provides an automated system and method for identifying the states of each agent participating in a distributed computation that must be journalled and the states that do not need to be journalled.

In contrast to other techniques used to ensure correction execution of protocols in the presence of failures, the present invention does not require a process state to be checkpointed on each send operation nor does it require processes to execute a snapshot protocol. Rather, the present invention assumes that the behavior derived for each finite state machine ensures correct execution.

SUMMARY OF THE INVENTION

In summary, the present invention is a system and method for automatically determining recoverable states of processes participating in the execution of a distributed application. The protocol analysis system of the present invention is provided with an initial set of data specifying all the states of the finite state machines used in a particular application process, and data specifying whether the state transition from each state to another state is caused by (A) receiving a message, (B) unreliably sending a message, or (C) performing an external action, which is equivalent to reliably sending a message. For each finite state machine, the initial specification data also indicates which state is the initial state, and which other states are known to be final states. Final states are states from which the finite state machine can immediately terminate its execution. All states not initially denoted as final states are initially denoted as intermediate (i.e., non-final) states.

From the initial specification, the protocol analysis system first determines if any intermediate states can be re-categorized as final states. Secondly, the protocol analysis determines if any state transitions initially identified as unreliable message send operations must be treated as "derived external actions", and thus made reliable. Derived external actions are messages that must be sent reliably in order to ensure that local protocols eventually terminate. Thirdly, after derived external actions have been identified, all newly derived final states have to be checked to ensure that they still satisfy the criteria for a final state. If not, the state is removed from the set of final states and added to the set of intermediate states. The resulting determinations as to which states are final states and which messages must be reliably sent are recorded and used to govern execution of the application process.

In accordance with normal application recovery requirements, when executing an agent (i.e., application process) whose behavior is defined by a finite state machine, intermediate states are recorded on stable storage as well as the first final state entered after a sequence of intermediate states. Messages which must be sent reliably are journalled (i.e., recorded on stable storage) before being sent and are re-sent until it is known that the receiving agent terminated or that the receiving agent recorded receipt of that message on stable storage. Before an agent sends a message to another agent, all associated message journalling and state transition journalling has to be completed, which means that the agent must await acknowledgement from the journalling process that the journalling operation was successful.

Upon recovery from a system failure, an agent must continue execution if the last state of the agent recorded on stable storage is an intermediate state. Otherwise execution of the agent is considered to be terminated. Once an agent has reached a final state and all acknowledgments expected by the agent have been received, then all information journalled for that agent can be discarded (i.e., archived).

A number of these normal application recovery requirements are modified by the journalling optimization procedures of the present invention. These optimization procedures detect situations in which journalling actions that would otherwise be required can be avoided or modified, thereby enabling the affected application processes to run faster and more efficiently. The final/intermediate state re-categorization procedure of the present invention and the journalling optimization procedures of the present invention are defined and performed in a general fashion so as to be applicable to any distributed computation, making it possible to optimize journalling operations for any specified distributed computation.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

In the context of the present invention, one "finite state machine" is associated with each process or agent participating in a protocol. Each finite state machine is defined in terms of a set of states and state transitions caused by events (such as sending and receiving messages). The states of the finite state machine always include an initial state and a set of final states, and usually include a set of intermediate states. Execution of a state machine starts in an initial state and can be terminated after reaching any of the final states. The occurrence of a specified event causes a state transition and determines a subsequent state. Each "state" represents the status of one finite state machine (i.e., agent).

The term "external action" is used herein to refer to any action that causes state information to be recorded on an external device. For example, storing data on stable storage is an external action, as is displaying a message on a terminal or setting machinery to a particular state.

States are characterized in the present invention as intermediate or final. Intermediate states (which may or may not include the initial state) require the occurrence of further events prior to termination of the process, while final states do not require the occurrence of any further events. To ensure that further events and state transitions occur, despite any failures that may occur, intermediate states must be recoverable, which means that sufficient status information must be stored on stable storage to restart the associated process at that state.

Events identify send or receive operations. As will be discussed in more detail below, certain send operations must be executed reliably such that at least one message is delivered successfully. Other send operations need not be reliable.

Figure 1:
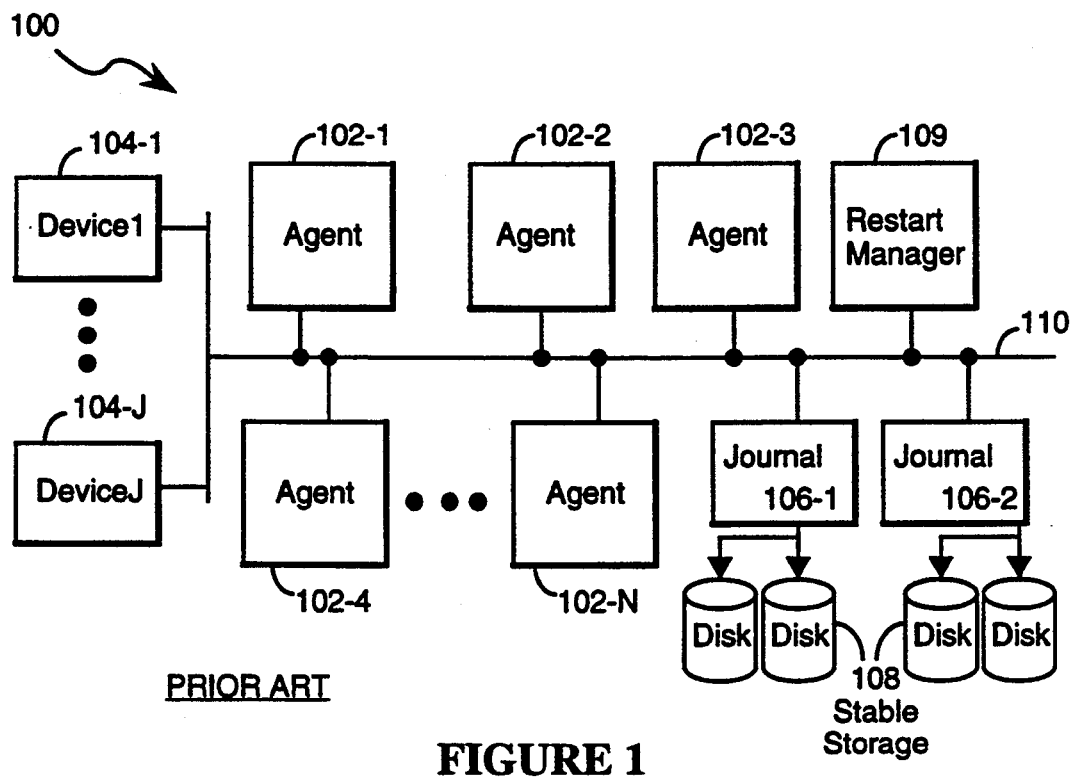
FIG. 1 is a block diagram of a distributed data processing system with a number of interdependent agents.
Figure 2A:
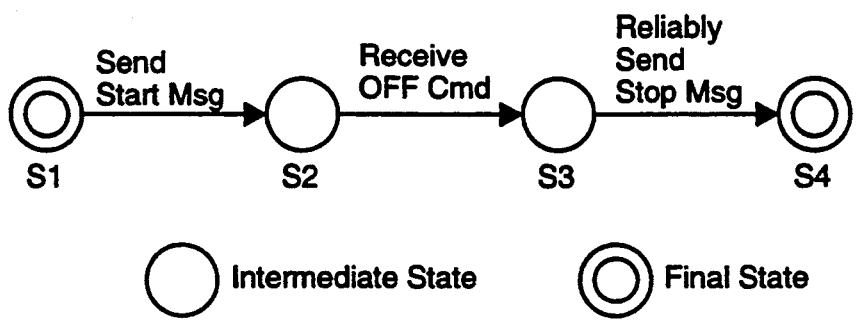
FIGS. 2A and 2B show state transition diagrams demonstrating how intermediate states can be re-categorized as final states.
Figure 2B:
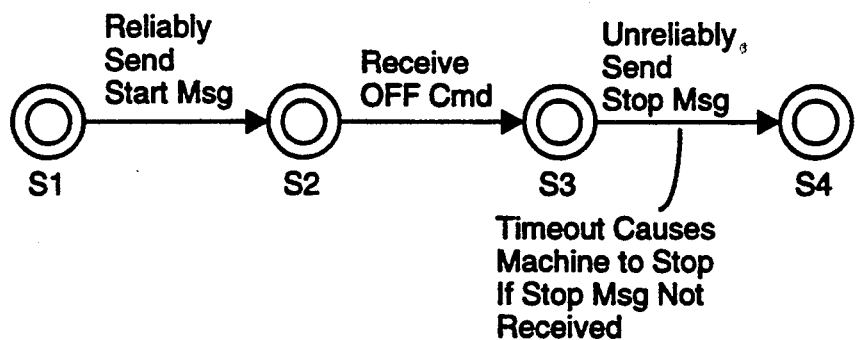

For example, referring to FIG. 2A, consider a process which controls operation of a machine. The four states of the process are labelled S1, S2, S3 and S4. The process moves from an initial state S1 to state S2 after a start message is sent to the machine, thereby initiating execution of the machine. Execution of the machine is stopped after receiving an "off" command from a human operator or another process, which moves the process to state S3. To turn off the machine, the process initiates a "stop" operation, which is an external action. Execution of the protocol for this process must continue until the machine has been stopped and the protocol has reached a final state, S4. Since the machine must be switched off by the process, the stop message must be sent reliably. As a consequence the process must receive the off command and therefore the off command must also be sent reliably.

In FIGS. 2A, 2B, 5–7 and 9–11, intermediate states are identified by nodes comprising empty circles, final states are identified by nodes having two concentric circles, and state transitions are identified by directed lines between nodes. In FIGS. 5–7, and 9–11 state transitions associated with external actions (including reliable send operations) are identified by bold directed lines. Consider an alternate situation in which the above mentioned machine is designed to stop automatically due to a time-out. In that case the stop command does not need to be sent reliably, allowing the process to terminate in state S3 without causing serious problems. Even the off command may be omitted without causing problems, thus allowing the process to terminate in state S2 as well as S4. This also relaxes the requirements on the human operator who may now omit the off command without causing a serious problem. From the viewpoint of someone external to the process running the protocol of FIG. 2B, if the machine is off, it is impossible to determine whether the machine was turned off by a timeout or by a stop message. Furthermore, to reach a consistent final state, it is no longer necessary to be able to recover states S2 and S3. Therefore, fewer states must be recorded on stable storage to correctly execute the protocol in the presence of failures.

The above example shows several aspects of recoverable processes that are important to the present invention. External actions identify state transitions whose occurrence, and sometimes also whose non-occurrence, must be known by some real world process to ensure termination of the associated real world process such as a machine performing a particular process. Starting from these operations, other operations, some only visible inside a computing system, may be identified as "derived" external actions. In the above example, the receipt of the "off" command identifies a derived external action because it forces the receiving process to change its stable state to ensure correct execution in the presence of failures. Derived external actions will be explained in more detail below.

Reliable Send Operations

Protocol specifications for each finite state machine must indicate which state transitions are caused by messages sent and which state transitions are caused by messages received. Send operations and external actions identify messages to be sent by the process executing a local protocol. External actions are considered to be reliable send operations. Conceptually, external actions are implemented by repeatedly sending a message until an acknowledgement has been received. More generally, there is a guarantee that at least one message concerning the external action will be received.

Also, a process that reliably sends at least one message cannot terminate until acknowledgments have been received for all its reliably sent messages. It should be noted, however, that the requirement that an acknowledgement must be received in response to a reliably sent message can sometimes be satisfied in a somewhat backhanded manner. In certain circumstances, the receiving process may terminate without sending an acknowledgement of the received message. In that case, when the sending process attempts to resend the message because it has not been acknowledged, the operating system of the computer on which the terminated process resided will be unable to deliver the resent message and will respond to receipt of the re-sent message with a reply message that indicates that the receiving process has already terminated. A reply that the receiving process has terminated is treated by the sending process as an acknowledgement because it indicates that the message was received by the receiving process (which allowed the process to terminate).

In the preferred embodiment, a message status inquiry facility is provided so that any process awaiting receipt of a reliable message may also inquire regarding its status. A negative response to that inquiry indicates that the message will never be sent. Furthermore, repeatedly sending a message either requires the operation caused by the message to be idempotent (i.e., performed only once), or that it is possible to test or infer whether or not the operation caused by the message has been performed. The receipt of a reliable message causes the stable state of the receiving process to change. An acknowledgment is only returned after the state change has been successfully recorded on stable storage.

It is an assumption of the present invention that any individual message sent to a specified agent may be lost. This may be due to failures or other decisions local to the communication service. However, it is assumed that a message sent sufficiently often is eventually received. In particular, after recording on stable storage the attempt to send a message and re-sending the message until acknowledged, there is a guarantee that the message is eventually received.

In order to ensure that a message is reliably sent, the message must be recorded on stable storage prior to sending the message.

Determination of Final States

If a process must perform external actions after reaching a particular state, then that state is an intermediate state which must be journalled in order to ensure that the local protocol associated with the process will be continued after a failure. Thus, each intermediate state identifies a recoverable state whose occurrence must be recorded on stable storage before a message indicating the transition into that state can be sent.

Conversely, if a state machine has entered State A of a local protocol from which it may enter a final state without performing an external action, then State A can be re-categorized as a "derived final state". The reason for this is as follows. If no further external actions will be performed by the state machine, from the viewpoint of an external observer there is no way of distinguishing whether the state machine terminated in State A or terminated after entering the following final state. Thus, if from State A all enabled state transitions are message receiving operations (called receive operations) terminating in final states, State A can be re-categorized as a final state because receive operations do not reveal to an outside observer the current state of a local protocol.

In addition, if from an intermediate State A a final state can be reached by executing an unreliable send operation (i.e., by sending a message that may not reach its destination), State A is re-categorized as a final state because an outside observer cannot distinguish whether execution of the local protocol was terminated before or after sending the message.

Basic Journalling

When executing the application process, a recovery manager can always determine whether or not a local protocol last entered an intermediate state if the following conditions are satisfied:

(1) Intermediate states entered are recorded on stable storage;
(2) The first final state entered after a sequence of intermediate states is recorded on stable storage;
(3) All reliably sent messages must be recorded on stable storage before being sent; and
(4) Messages indicating state transitions into and out of intermediate states are sent only after the next state entered has been recorded on stable storage and the journalling process has confirmed that the next state has been successfully recorded on stable storage.

The above requirements are the primary criteria for determining what state information concerning an application process needs to be journalled and when the journalling actions need to occur. In accordance with the present invention, some of these primary journalling criteria are superceded by one set of optimization criteria that define when certain information can be journalled with less restrictive ordering constraints than those listed above, and by another set of optimization criteria that determine when journalling of certain state information can avoided altogether.

The fourth requirement listed above is herein called "synchronous journalling" because the sending of messages is synchronized with the completion of the journalling of the associated state transition by the sending process. For example, if an unreliable send message M1 causes a transition into intermediate state C2, the state C2 is recorded on stable storage prior to sending the message M1. Standard, basic journalling of state transitions is accomplished using synchronous journalling.

The above stated "rules" for journalling process states and state transition information in a recoverable distributed computation are modified by the run-time journalling optimizations of the present invention, discussed below. However, those optimizations all depend on the detection of special circumstances that allow these rules to be relaxed, while still ensure that the distributed computation is recoverable regardless when or where a failure may occur. Thus, the above stated rules are still the basis for the protocol analysis and optimization procedures of the present invention.

Derived External Actions

Making intermediate states recoverable ensures that execution of a local protocol (i.e., an application process) is always continued correctly. In order to ensure that the application process will be recoverable in a state consistent with external actions already performed by the application process, certain send operations must be made reliable and certain states of the application process must be journalled. It must also be guaranteed that a protocol eventually terminates after entering an intermediate state. As long as a local protocol can make progress without having to wait for messages to arrive, termination of the local protocol can be ensured by local scheduling algorithms. However, if messages must be received to continue, those messages must be sent reliably. These are recorded on stable storage and sent until acknowledged. Reliable send operations are considered to be external actions.

For these reasons, the initial specification of an application process's states and state transitions may need to be modified in order to ensure that the application process is always continued correctly and to ensure that the application process will eventually terminate. As will be described below, the present invention provides a procedure for modifying the initial state and state transition specification to satisfy these requirements.

In the preferred embodiment, agents or processes waiting for one of several possible messages to arrive may issue an inquiry to find out about the current state of a send operation. If the send operation is a reliable send operation, then the inquiring process will receive as a response either the actual message, or a negative acknowledgment (which means that the message will never be sent). If the send operation that is the subject of the inquiry is an unreliable send operation, the response will be either an acknowledgement (meaning that the message was sent), a negative acknowledgment (meaning that the message has not yet been sent), or an indication that the sending process has already terminated.

When receipt of a reliably sent message triggers an external action, the received message is acknowledged only after the triggered external action has been successfully initiated (i.e., after the reliably sent message associated with the external action has been stored on stable storage).

Based on the above criteria, derived external actions are determined as follows. When all enabled state transitions from an intermediate state are receive operations, at least one of which causes a transition to an intermediate state, then the unreliable send message operations which cause a transition (by the receiving process) into an intermediate state must be converted into reliable send operations. Those "derived" reliable send operations are sometimes herein called derived external actions.

As will be discussed below, deriving external actions may require that states formerly categorized as derived final states be re-categorized as intermediate (recoverable) states. As a result the determination that some send operations need to be reliably send operations will cause additional journalling actions to be performed each time the application process is executed.

For convenience, receive operations that receive reliably sent messages will sometimes herein be called reliable receive operations. Thus, a reliable receive operation is one that corresponds to a reliable send operation of another finite state machine.

Note that a single state transition can have more than one receive operation associated with it, for instance when either of two received messages M1 or M2 will cause a state transition from state S1 to state S2. In such cases, all the receive operations associated with a single state transition are either converted into reliable receive operations or all are not converted.

An alternate version of the above rule concerning the generating of derived external actions is that the receive operation(s) of one state transition can be left as an unreliable receive operation. The reason that the receive operation(s) associated with one state transition can be left as unreliable receive operations is that the receiving process can send inquiries for the reliable receive operations of all the other state transitions, and can thereby determine indirectly if the remaining state transition will be the one that moves the finite state machine to a next state. If all inquiries to the processes associated with the reliable receive operations produce negative acknowledgements (meaning that the associated messages will never be sent), then the remaining state transition is guaranteed to occur.

Since the receive operations associated with one state transition do not need to be converted into a derived external action, there needs to be a basis for choosing which receive operations to convert and which not to convert. At least three different selection mechanisms could be used: (1) a random choice, (2) presenting the options to a human operator or engineer for selection of the receive operations to be converted into derived external operations, or (3) determining which choice will cause the least number of external actions (e.g., input/output operations associated with subsequent intermediate states) and selecting that choice. The third option can be implemented by performing a tree search and counting intermediate states and external actions, including intermediate states and external actions by other processes participating in the application execution process. In most practical instances, the number of states in each state machine is not large and therefore the tree search will not be extensive. The second option allows a human to take into account factors such as knowledge regarding which state transitions occur most often, which may affect the average number of external actions that will be associated with each potential choice of receive operations to be converted into reliable receive operations.

Further, as will be understood by those skilled in the art, it is possible to define various strategies, based on the knowledge of the sending process which normally must send a message reliably about the status of the receiving process, to identify situations where such messages do not need to be sent reliably. One such situation is where it is known that the receiving process cannot yet be in the state where it waits for the message to be reliably sent, and another situation is where it is known that the receiving process will never be in the state where it waits for the message to be reliably sent.

OFF-LINE JOURNALLING OPTIMIZATION AND PROTOCOL ANALYSIS METHOD

The goal of the off-line protocol analysis procedure of the present invention is to generate either a "state transition control table" (to be used in conjunction with a predefined program that utilizes the generated table to control the journalling of state transitions) or a state transition control computer program that will control the journalling of state transitions by a process participating in a distributed computation.

Figures 3, 4:
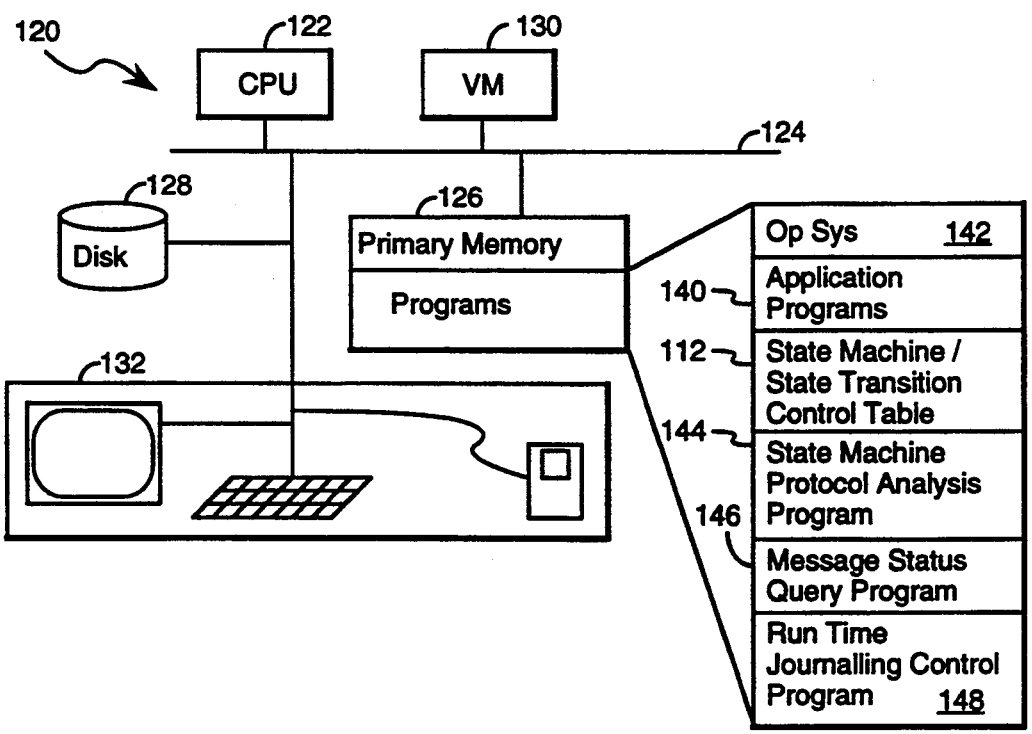
FIG. 3 depicts a finite state machine specification table used as the starting point of the protocol analysis performed by the present invention.
FIG. 4 is a block diagram of a data processing system for performing the protocol analysis procedures of the present invention and for executing local protocols associated with one or more agents participating in an application process.

The process of analyzing the protocols associated with the finite state machines used in a particular application process begins with generating (or providing) an initial state machine table 112 (also herein called a state transition control table), an example of which is shown diagrammatically in FIG. 3. The state machine table 112, at a minimum, must include for each finite state machine (FSM) that participates in the application process (A) a list of the states for the FSM, (B) data indicating which states are known from the outset to be final states, (C) data concerning each of the state transitions from each state to another state, including (C1) the next state in the FSM after the state transition, (C2) an indication as to whether the state transition is the result of a receive operation, an unreliable send operation, or a reliable send operation), and (C3) the other FSM or External Device to which each send message is directed or from which an receive message is to be received. The state machine table 112 may also indicate which state is the FSM's initial state (e.g., by listing that state first in the table 112).

For example, the initial specification of the set of finite state machines in the computer system, their states and state transitions can be represented by a database table. The format of each record of that database table can be represented as follows:

FSM ID, State ID, State Type, Next State,
Transition Event Type, Action where each record specifies one transition from a first state (identified by the State ID) of a first finite state machine (identified by the FSM ID) to a Next State. The Transition Event Type is equal to "receive", "reliable send", or unreliable send. In some embodiments, the "receive" Transition Event Type can be divided into two event types: unreliable receive and reliable receive. The Action identifies the nature of the message to be sent or received and the external device or finite state machine or process to which a message is to be sent or from which a message is to be received. The State Type is equal to "initial", "intermediate" or "final". If there are N different possible transitions from a particular state, then the database table will have N records having the same FSM ID, State ID and State Type. Of course, the database used to represent an initial state transition specification could be organized in other ways than the one represented here.

From the initial specification, the protocol analysis system first determines if any intermediate states can be re-categorized as final states. Secondly, the protocol analysis determines if any state transitions initially identified as unreliable message send operations must be treated as "derived external actions", and thus made reliable. In particular, if all the enabled state transitions from a particular intermediate state are caused by receive message operations, at least one of which leads to an intermediate state, then a sufficient set of those receive operations must be made reliable to ensure that the finite state machine's process will eventually terminate. The determination of derived external actions was discussed in more detail above. Thirdly, after all derived external actions have been identified, a search is made for derived final states that must be re-categorized as intermediate states. The resulting determinations as to which states are final states and which messages must be reliably sent are recorded in the state machine table, which is then used to govern execution of the application process.

Table 1 provides a pseudocode representation of the protocol analysis process. Tables 1 and 2 contain pseudocode representations of software routines relevant to the present invention. The pseudocode used in those tables are, essentially, a computer language using universal computer language conventions. While the pseudocode employed here has been invented solely for the purposes of this description, it is designed to be easily understandable by any computer programmer skilled in the art.

The above described protocol analysis is an "off-line" process in that it is typically performed prior to execution of the application process. A second embodiment of the present invention, discussed below, performs similar optimizations (as well as some additional optimizations) during run time based on information obtainable only during run time about the other participants in a distributed transaction or computation.

FIG. 4 shows a data processing system 120 for performing the protocol analysis of the present invention and for executing local protocols associated with one or more agents participating in an application process. Data processing system 120 contains the standard computer system components, including a data processing unit (CPU) 122, system bus 124, primary memory 126 (i.e., high speed, random access memory), mass storage 128 (e.g., magnetic or optical disks), virtual memory manager 130, and user interface 132 (e.g., keyboard, monitor, pointer device, etc.). These physical computer components are not modified by the present invention and are therefore not described in detail herein.

TABLE 1

PSEUDOCODE FOR PROTOCOL ANALYSIS

Provide Initial State Machine Table
-- Search for Intermediate States that can be converted to Final States:
Do For each FSM:
    Starting at each terminal State, and progressing toward the initial state of
    the FSM, Do for each intermediate State I:
    (A)    If all state transitions from the State I are caused by receive
           operations and all subsequent States are Final States, then convert
           State I to a Derived Final State.
    (B)    If there is any state transition from State I to a Final State and that
           state transition is caused by an unreliable send operation, convert
           State I to a Derived Final State.
                (Some derived final states may later be reconverted back to
                intermediate states if they no longer satisfy the above
                conditions.)
    EndDo
EndDo
-- Find Derived External Actions
Set of FSM's to evaluate = all FSMs.
Do While Set of FSM's is not empty:
    Select one FSM in the set.
    For each intermediate State I in the selected FSM having only receive
    operation state transitions:
    (C)    If at least one of those state transitions has a Next State that is an
           Intermediate State, then convert the send operations that cause
           those receive operations into reliable send operations (also called
           Derived External Actions). **
    For each send operation converted into a reliable send operation:
    (D)    If the state SC (of finite state machine FSM1) preceding the
           reliable send operation is a derived final state, and there are
           no unreliable send operation that transitions FSM1 from the
           state SC into a final state, then reconvert state SC back into
           an intermediate state.
           If state SC was converted to an intermediate state, re-evaluate
           each other derived final state of finite state machine FSM1 to
           determine if it needs to be converted back into an intermediate
           state.
           Add FSM1 back into the set of FSMs to be evaluated.
    EndDo
    EndDo
    Remove selected FSM from the set of FSMs to evaluate.
EndDo
Output Modified State Machine Tables for each FSM.
Generate Customized Run Time Journalling Control Program (148) based on
Modified State Machine Table.
-- End of Protocol Anylsis Procedure
** The process of generating Derived Final States can be optimized so as to
reduce the number of reliable send operations and intermediate states

TABLE 1-continued
PSEUDOCODE FOR PROTOCOL ANALYSIS generated. The optimizations listed here require that the receiving process be
able to inquire regarding the status of a reliable send operation. Thus, if the
receiving process determines that a particular message will never be sent, it
then knows that the corresponding state transition will not be caused by receipt
of that message.
To minimize the number of reliable send operations and consequently the
number of intermediate states, either one of the following optimizations are
applied:
(O1) Convert into reliable send operations only those send operations that
cause receive operations leading from one intermediate state into another
intermediate state. In other words, if an unreliable receive operation
causes a transition to a final state, it's corresponding send operation need
not be converted into a reliable send operation.
  The receiving process can query the status of all messages corresponding
  to reliable receive operations. If the receiving process determines that
  none of the messages that would cause the receiving process to transition
  to another intermediate state will ever be received, the receiving process
  can enter a final state and terminate its execution.
(O2) Convert all but one of the send operations that cause the receive
operations into reliable send operations, and convert the corresponding
unreliable receive operations into reliable receive operations. Select the
unreliable send operation not converted into a reliable send operations
based on predefined criteria (such as random selection, or other
predefined rule).
  The receiving process can query the status of all messages corresponding
  to reliable receive operations. If those queries result in the determination
  that none of those messages will ever be sent, the receiving process can
  then make the only remaining state transition.

Stored in primary memory 126 are currently executing application programs 140, as well as operating system software 142, the state machine table 112, the state machine protocol analysis program 144 that categorizes states as intermediate or final and determines derived external actions, a message status query program 146, and a run-time journalling control program 148. As discussed above, the message status query program 146 is used by processes waiting to receive one of several messages to determine whether a particular message has or will be sent. In one embodiment, where the run-time journalling control program 148 is a predefined program use to control journalling of all application processes, the program 148 uses the modified state machine table 112 generated by the protocol analysis program to determine which FSM states and which messages to journal, as described above. In a second embodiment, the protocol analysis program 144 is also a code generating program that generates a customized run-time journalling control program 148 for each application process in accordance with the modified state machine table 112. In either embodiment, the run-time program 148 also implements the run-time journalling optimizations discussed below.

Example of Off-Line Protocol Analysis

Figure 5:
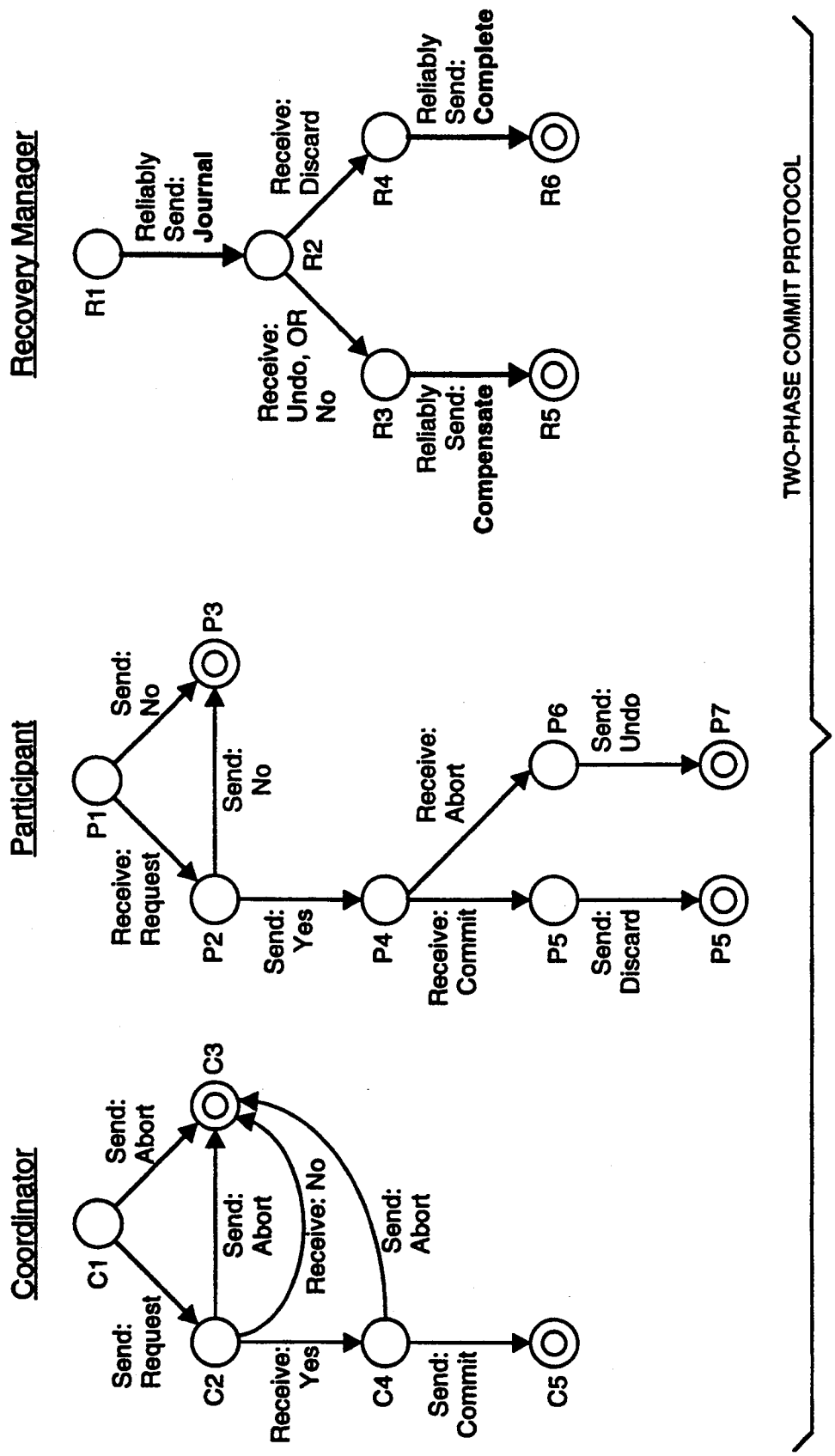
FIG. 5 depicts a state transition diagram of a two-phase commit protocol prior to application of the protocol analysis methodology of the present invention.

FIG. 5 shows a simplified state transition diagram of a two-phase commit protocol prior to application of the protocol analysis methodology of the present invention. This is essentially a diagrammatic representation of the state machine table 112 that would be provided to a protocol analyzer implementing the present invention. In this example, the application process has three finite state machines called the Coordinator, the Participant, and the Recovery Manager, having respective states labelled C1-C5, P1-P7 and R1-R6. Only terminal states have been identified at this point as final states, and only known external actions that affect storage of certain data are marked as such. Two-phase commit protocols allow processes to agree whether to commit, or abort and rollback the results of a transaction. The coordinator requests all participants (of which only one is shown in this simplified example) to vote on the outcome of the transaction. If all participants vote yes, the coordinator may commit the transaction and send a commit message to all participants. Before voting on the outcome of a transaction, participants are allowed to abort. In many cases an abort is triggered by a process failure. Participants are assumed to perform operations such as updates to secondary storage, i.e., external actions. Upon failure or abort, external actions must be compensated in order to leave the system in a consistent state. Upon commit, pending external actions (e.g., pending compensation actions) must be discarded. This also requires an additional external action.

Applying the protocol analysis methodology of the present invention, it can be seen that the only two state transitions enabled when the Recovery Manager is in state R2 are two receive operations, both of which transition to intermediate states. In accordance with the present invention, proper termination of this Recovery Manager process can be guaranteed only if one of these two state transitions is converted into a derived external action. Thus, either the discard message, which indicates that pending compensations must be discarded, or messages that indicate compensations must be executed, must be sent reliably. We will assume that the discard message is selected as a derived external action (because less messages need to be made reliable by selection of its state transition).

Next, it can be seen that the only two state transitions enabled when the Participant is in state P4 are two receive operations, at least one of which transitions to an intermediate state (P6 will be converted to a final state, but P5 will not be converted to a final state). In accordance with the present invention, proper termination of the Participant process can be guaranteed only if one of these two state transitions is converted into an derived external action. Thus, either the abort message or the commit message must be sent reliably. Either is a valid choice.

Figure 6:
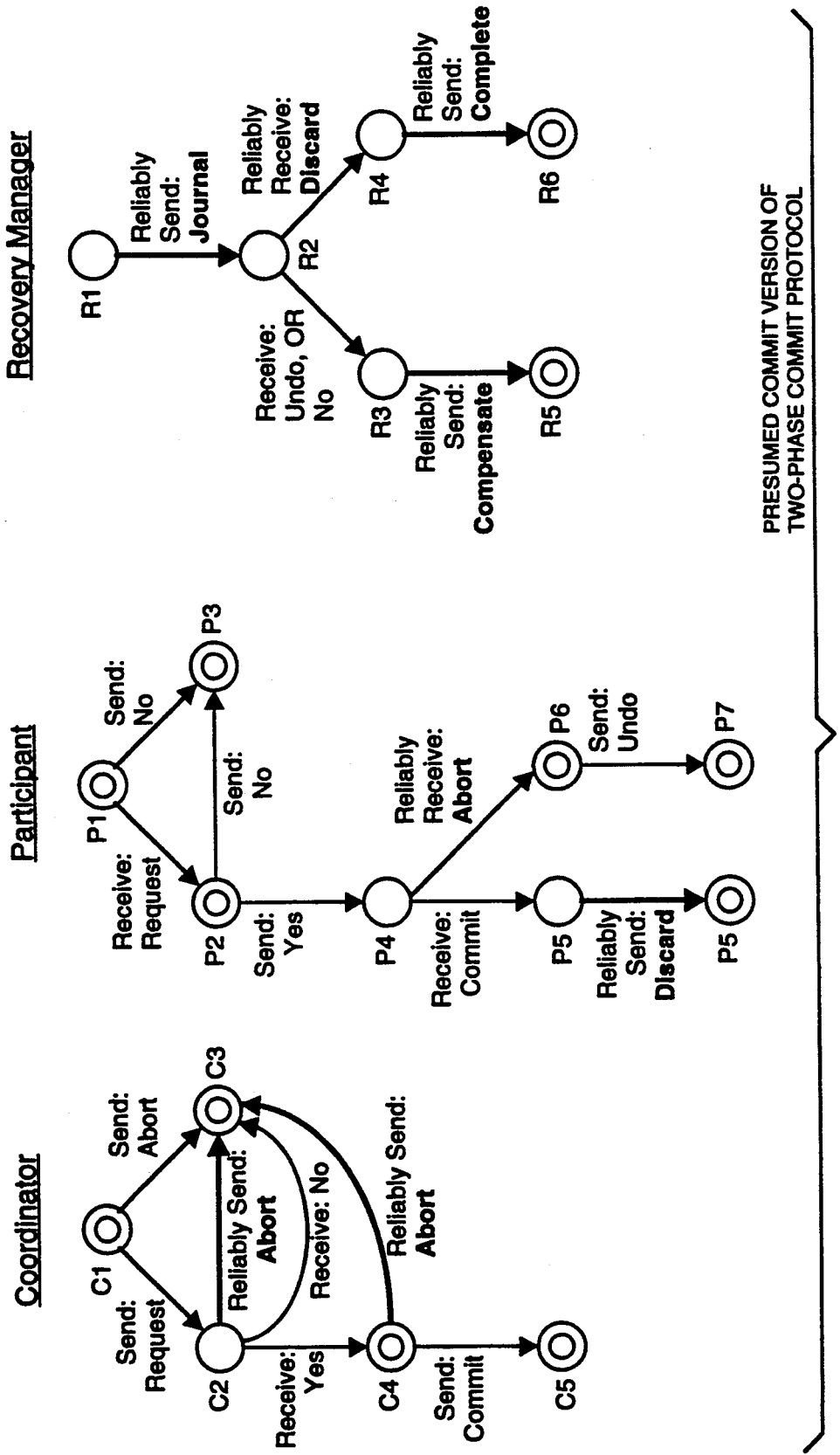
FIGS. 6 and 7 depict two modified versions of the state transition diagram of FIG. 5 for "presumed commit" and "presumed abort" versions of the two-phase commit protocol, respectively.

FIG. 6 shows the protocol resulting from selection of the abort message as the one to be sent reliably, followed by application of the above-described rules regarding conversion of intermediate states to final states. This protocol is a "presumed commit" protocol, in that failure to receive an abort message from the Coordinator causes the Participant to assume that a commit message was sent, resulting in a commit of the transaction.

Figure 7:
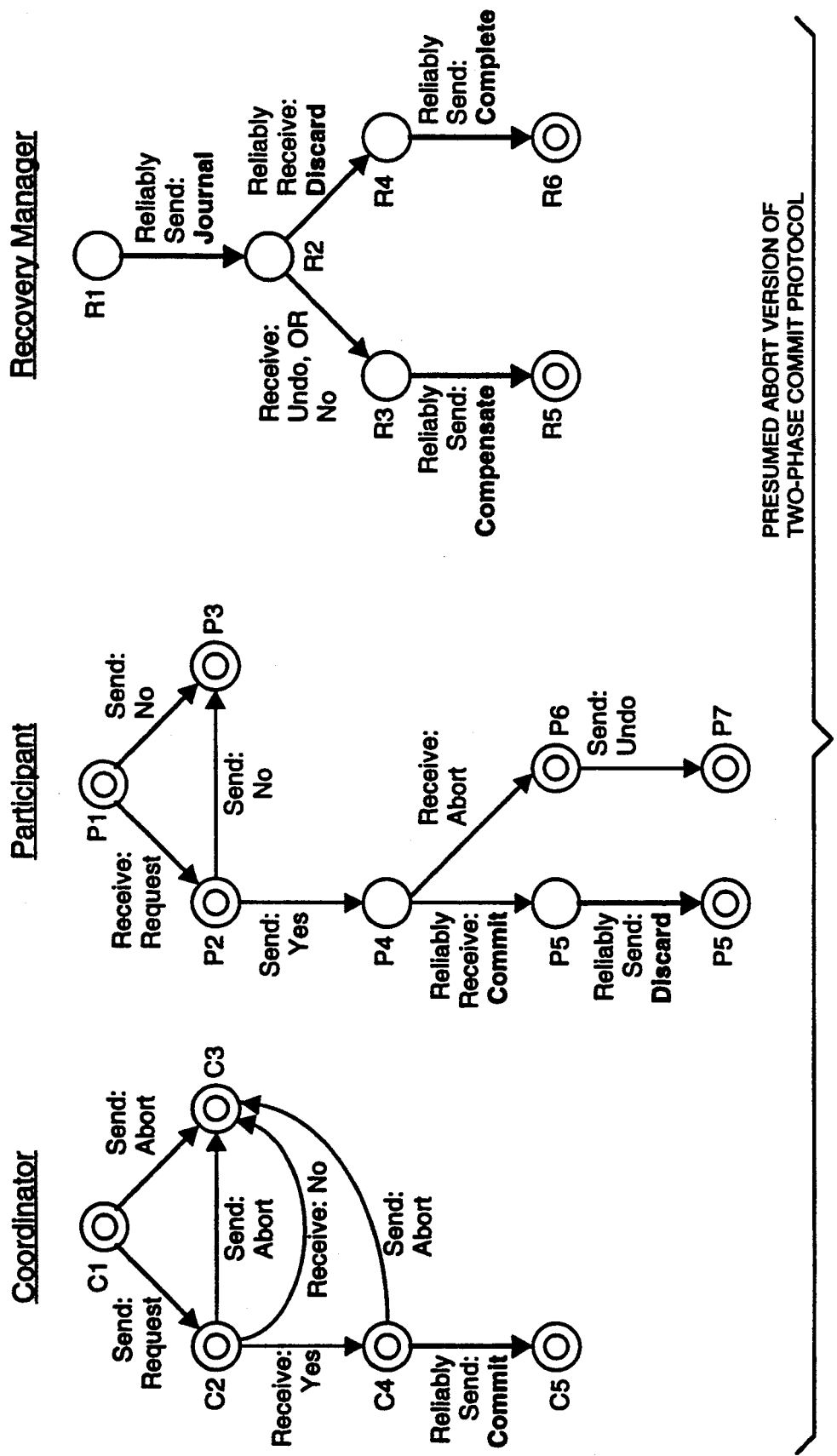

FIG. 7 shows the protocol resulting from selection of the commit message as the one to be sent reliably, followed by application of the above-described rules regarding conversion of intermediate states to final states. This protocol is a "presumed abort" protocol, in that failure to receive an commit message from the Coordinator causes the Participant to assume that an abort message was sent, resulting in a rollback of the transaction by performing the compensate external action.

Other variations of the two-phase commit protocol are possible. For instance, if no external actions are performed during execution of a transaction, then the Recovery Manager does not need to participate in the protocol and no further external actions need to be derived. To accomplish this, the Participant state machine could be modified to allow the Participant to dynamically determine whether it has performed external actions and to terminate after sending its yes vote if no external actions were performed. Similarly, the Coordinator state machine could be modified to allow the Coordinator to dynamically determine whether any external actions need to be performed after receiving a yes vote and to terminate if no external actions are needed.

RUN-TIME JOURNALLING OPTIMIZATIONS

The run-time optimization procedures discussed below are incorporated into the run-time journalling control program 148 (see FIG. 4). Some of these optimizations can be implemented, at least in some circumstances, in off line embodiments of the Invention. In those cases, those portions of the optimization procedures discussed below are also incorporated into the state machine protocol analysis program 144.

In many distributed computations, it cannot be determined until run time whether certain messages need to be sent reliably. Thus, when applying the above described off-line journalling optimization procedure to such distributed computations, each "send message" operation that may or may not need to be sent reliably would probably be initially categorized as a "reliable send" operation. However, during execution of the distributed computation, some of the participants may inform other participants that future messages to them can be sent unreliably. For instance, a participant that does not durably store anything as a result of a particular computation may not need to reliably receive an "end of computation" message, and it may so inform another participant of the computation when acknowledging a previously received message or when it sends a message otherwise required by the computation to another participant.

In accordance with the present invention, whenever a participant to a distributed computation receives an "unreliable send okay" message from another participant, it dynamically revises its state transition table 112 in accordance with step C of the procedure shown in Table 1 so as to reduce the number of journalling operations performed whenever possible. Alternately, the run time journalling control program will retain information derived from such messages to streamline or modify its journalling decision process. Typically, the procedure of Table 1 will be utilized during compilation of the programs that execute the distributed computation, and thus all derived final states and all derived external actions will be determined at compilation time. In situations where the nature of state transitions can be changed at run time (e.g., from an reliable send to an unreliable send), all the above described rules for reclassifying states will need to be re-evaluated at run time to minimize the number of intermediate state and thus to optimize execution of the application processes.

It should be noted that the states of application processes may need to be re-evaluated if reliable send operations are either added or removed from the protocols during execution of the application processes. Thus, in general, the state reclassification procedures discussed above will, in some situations, also be applied during run time.

However, as discussed below, the present invention also includes a number of additional run-time journalling optimizations.

Asynchronous Journalling Optimization With Timestamped Messages

While some prior systems use asynchronous journalling to optimize specific implementations of the two-phase commit protocol, the determinations as to when asynchronous journalling is to be performed are generally hard coded into the programs that employ those protocols. The following protocol optimizations, which reduce the expense associated with journalling state information, can be incorporated into the methodology of the present invention in general manner so as to be applicable to any specified distributed application process.

Figure 8A:
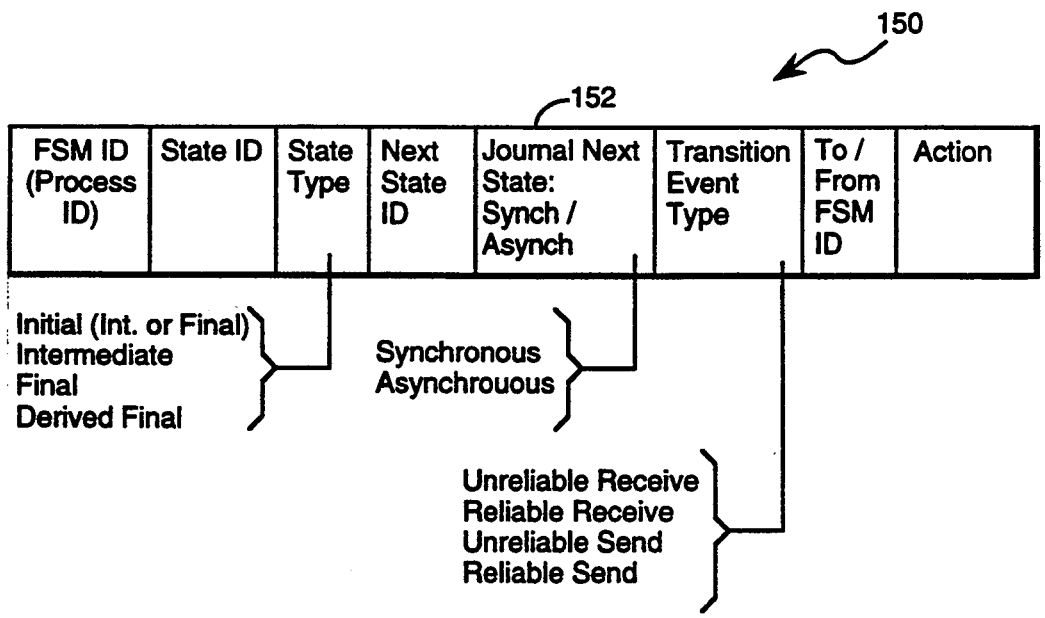
FIG. 8A shows the schema of a version of the finite state machine specification table shown in FIG. 3, modified to indicate when asynchronous journalling should be performed.
Figure 8B:
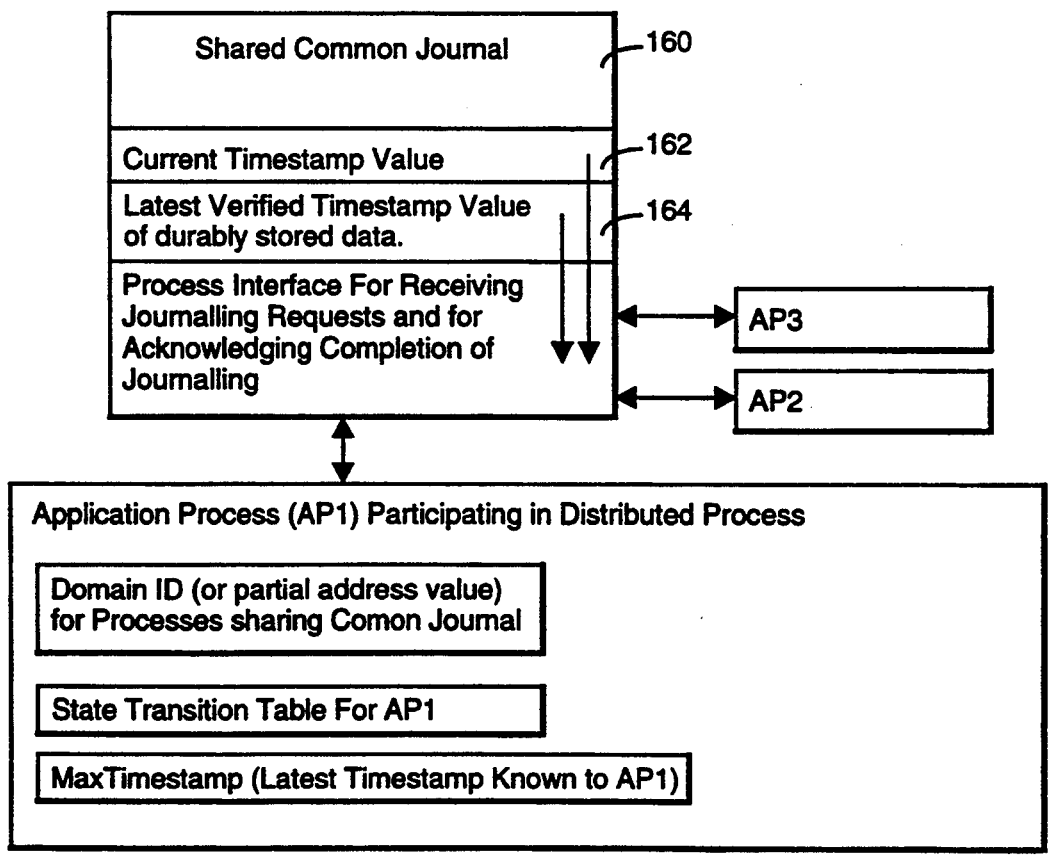
FIG. 8B is a block diagram of a journal process that is utilized or shared by more than one application process.

Referring to FIG. 8A, a modified schema 150 for the finite state machine state transition table 112 is shown. This modified schema 150 provides a field for indicating journalling operations that can be performed asynchronously. FIG. 8B is a flow chart of the part of the application execution process that shows how any agent or process participating the distributed application process can use the modified state transition table (not shown) to determine when to use synchronous journalling and when to use asynchronous journalling of state transitions and external events.

When executing the application process, the following information is normally journalled: (1) intermediate states entered are recorded on stable storage; (2) the first final state entered after a sequence of intermediate states is recorded on stable storage; and (3) reliably sent messages. Messages are sent (to other processes) only after all associated data to be journalled has been recorded on stable storage. This requirement is herein called "synchronous " journalling.

However, if two processes share a common journal, messages may be sent before an acknowledgement has been received from the journal. This is an example of performing a journalling operation "asynchronously". The standard state transition journalling requirement, that messages indicating state transitions into and out of an intermediate state are sent after the next state entered has been recorded on stable storage, is a synchronous operation requirement.

The common journal guarantees that a consistent state will be recorded. That is, if the message is received and causes a state change in the receiving process that is recorded on stable storage, but the sending process fails, the recorded state change can be used to determine that the sending process reached the state associated with sending that message. Also, if the journal fails, upon recovery consistent state information will be recovered for all processes using the journal.

The advantage of sending a message before receiving an acknowledgement from the journal is that the application process can progress at a faster rate. The main "expense" associated with journalling is the delay associated with having to wait for completion of the journalling operation. Journalling operations that can be performed asynchronously rather than synchronously with respect to the invoking process are therefore much lower in cost than synchronous journalling operations.

The above described optimization makes it possible to release all resources of the computation, even those which have been updated, before the outcome of the computation has been recorded on stable storage.

In the present invention, the common journal optimization technique is performed automatically on any distributed application process as follows. For off-line implementations, a extra column, called the asynchronous journalling column 152 (see FIG. 8A), is added to the state machine table 112. Whenever it is known that two finite state machines share a common journal, state transitions in which messages are sent between the two state machines are marked in the table 112 as being eligible for asynchronous journalling. This process of determining opportunities for asynchronous journalling may be performed off-line when it is known in advance which processes will share a common journal.

More often, and in the preferred embodiment of the invention, the determination as to whether or not another process shares a common journal with the process sending a message will be determined at run time, for instance based on the address of the process to which the message is being sent (i.e., process addresses would be assigned based on the journal process used by each such process).

Referring to FIG. 8B, to implement the common journal optimization, it is required that the common journal 160 (sometimes called the common journalling process) has the ability to assign a sequence of tokens (often called timestamps) to the sequence of data records sent to it for journalling. In other words, every time the journal accepts an item for journalling, it returns a new timestamp or token. For simplicity, we will hereinafter refer to the sequencing tokens issued by the journal as "timestamps" with the understanding that the timestamps need not be equal to time values. The journal 160 assigns timestamp values in such a way (e.g., increasing in value for each subsequent journalling event) that any process can compare two timestamps so as to determine which is earlier and which is later.

The journal actually has to maintain two timestamp values: a "current timestamp" 162 assigned to each new set of data sent to the journal for storage, and a "latest verified timestamp" 164 which identifies the timestamp value assigned to the latest set of data that has been successfully stored by the journal on stable storage.

When any of the application processes AP1, AP2, AP3 that share the common journal 160 spool information to the journal for durable storage, the application process receives a current timestamp from the journal. The application process can then either wait for verification from the journal 160 that the data assigned that timestamp has been durably stored on stable storage, or it may proceed with other tasks, depending on whether the application is using synchronous or asynchronous journalling.

Figure 8C:
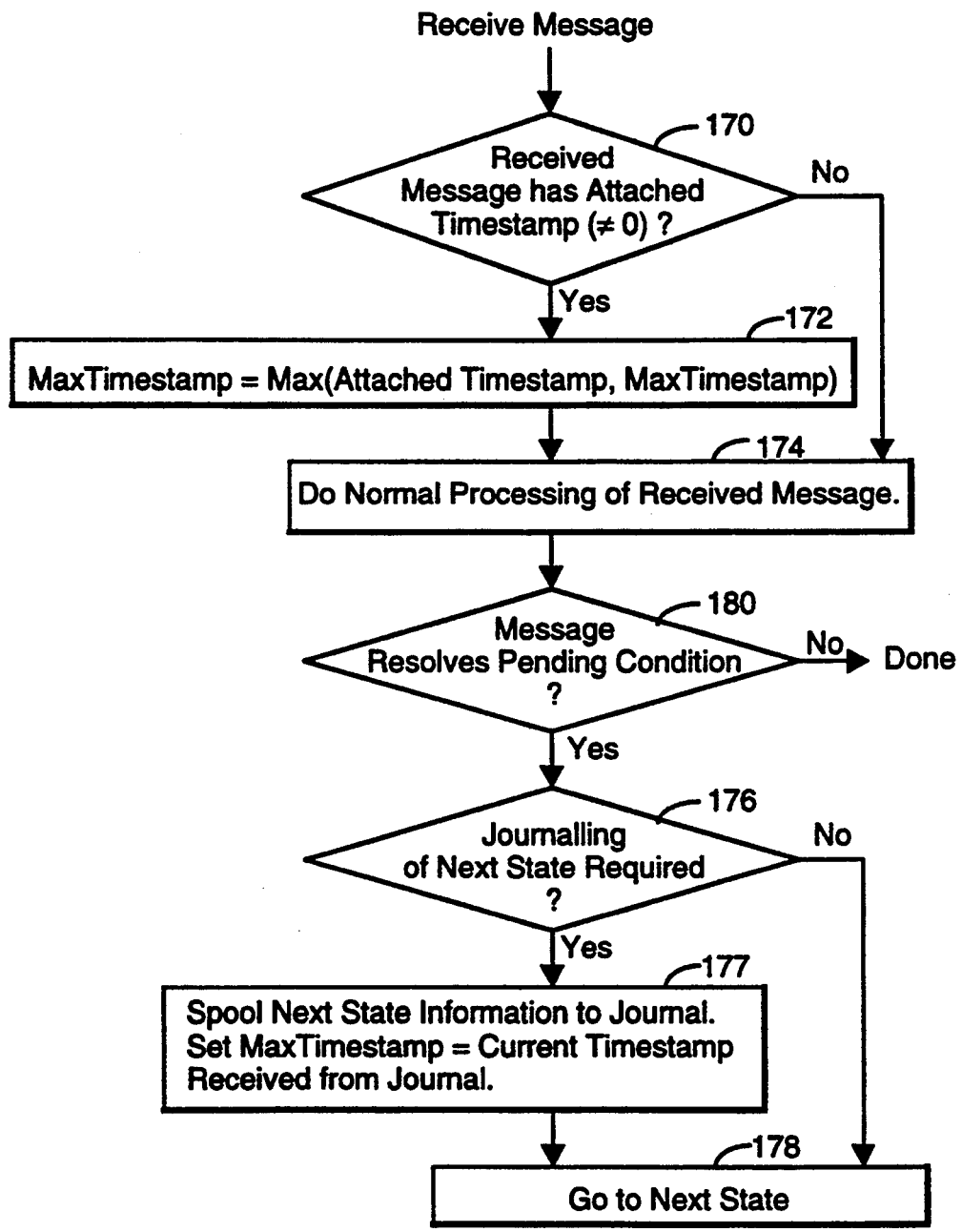
FIGS. 8C and 8D are flow charts of a procedure for performing a state transition in a system that utilizes both synchronous and asynchronous journalling of state transitions and reliably sent messages.
Figure 8D:
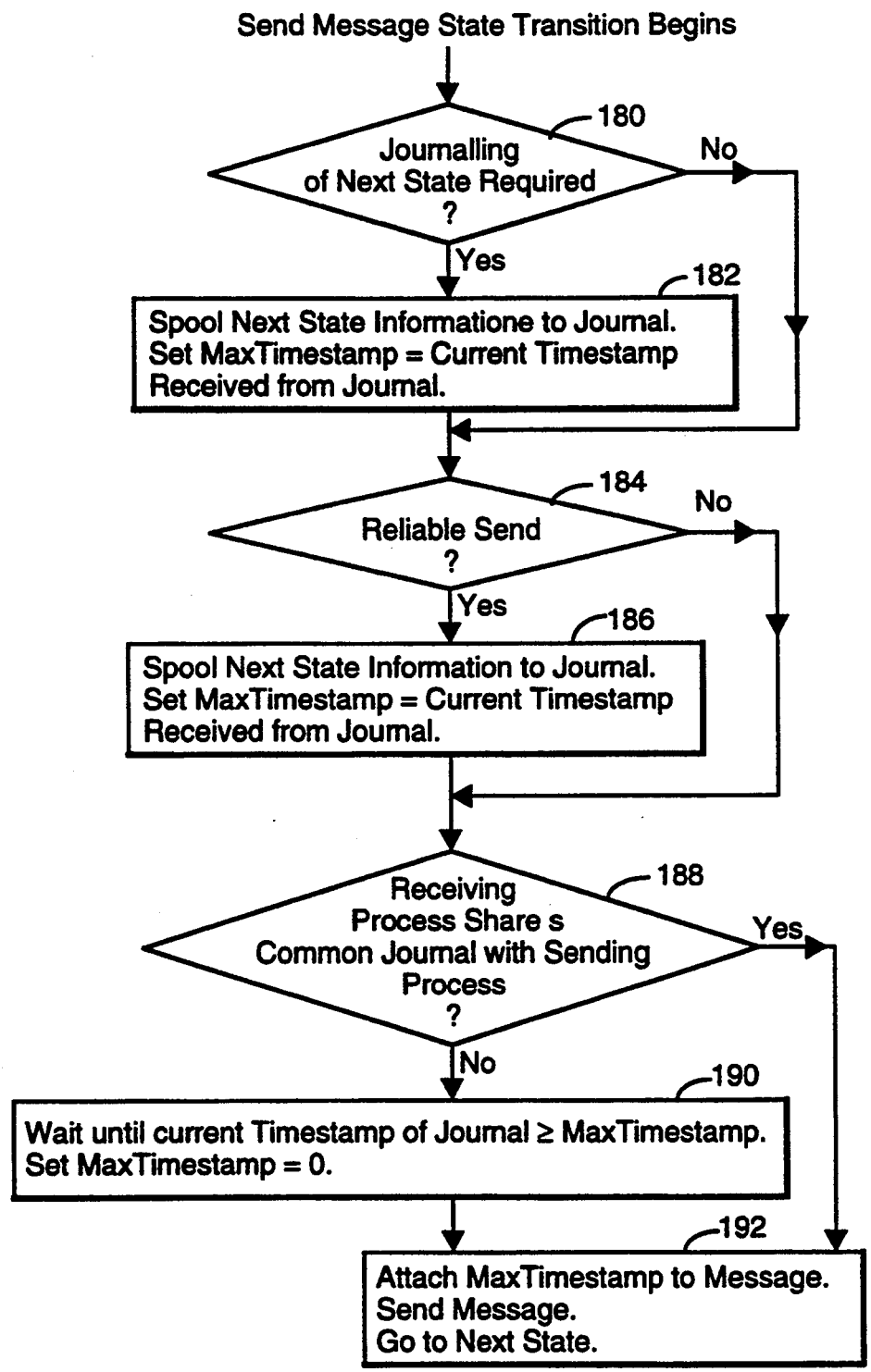

Referring to FIGS. 8C and 8D and the pseudocode representation of the common journal optimization procedure in Table 2, whenever an application process that utilizes a common journal receives a message, it inspects the message to determine if it has a timestamp (step 170). In the preferred embodiment all messages have an attached timestamp value, but the timestamp value is set equal to zero for messages sent between processes that do not share a common journal. Thus, a message having an attached timestamp value of zero is considered not to have an attached timestamp since the attached timestamp is not a real timestamp value.

Each application process maintains a variable called MaxTimestamp, which represents the maximum timestamp value received by that process either from a received message or from its journal. If the received message has an attached timestamp, the MaxTimestamp value of the process is updated to the larger of the process's current MaxTimestamp value and the Timestamp value attached to the received message (step 172).

After the received message has been processed by the application process (step 174), the process will proceed to move to a next state (steps 176, 177 and 178) if the received message resolves a pending condition and thereby enables the state transition (step 180). Note that a received message will not resolve a pending condition only if a state transition requires the receipt of two or more messages. If the next state of the receiving process needs to be journalled (step 176) (see next state journalling criteria, discussed earlier), the next state information is asynchronously spooled to the journal, and the MaxTimestamp value of the receiving process is set to the current timestamp value returned by the journal (step 177). Finally, the receiving process transitions to its next state (step 178).

Referring to FIG. 8D, when a send message type of state transition is to be performed, if the next state of the sending process needs to be journalled (step 180) the next state information is asynchronously spooled to the journal (step 182), and if the send operation is a reliable send (step 184), then the message to be sent is asynchronously spooled to the journal (see step 186). If both need to be spooled, the two spooling operations could be combined into one spooling operation. In either case, if any information is to be journalled, the MaxTimestamp value stored by the sending process is set to the current timestamp value returned by the journal (steps 182, 186).

Next, if the receiving process (to which the message is being sent) does not share a common journal with the sending process (step 188) the sending process waits on its journal until the latest verified timestamp of the journal is greater than or equal to the MaxTimestamp value stored by the sending process and then the MaxTimestamp value is set to zero (step 190). As mentioned above, in the preferred embodiment of the invention the determination as to whether or not another process shares a common journal with the sending process is based on the address of the process to which the message is being sent. For example, process addresses are assigned so that a predefined subset of the address bits identify the journal used by that process. If those address bits are the same for the sending and receiving processes, the two processes are known to share a common journal.

Figure 9A:
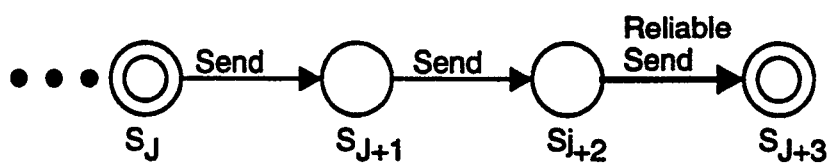
FIGS. 9A and 9B depict a sequence of state transitions of an application process before and after application of a journalling optimization procedure of the present invention.
Figure 9B:
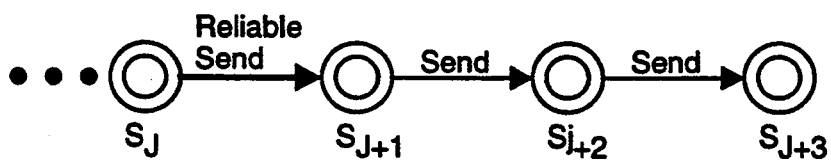

If the receiving process shares a common journal with the sending process, the wait step is avoided and the previously stored MaxTimestamp value is left unchanged. Finally, the MaxTimestamp value current stored by the sending process is attached to the message to be sent, the message is sent, and then the sending process transitions to its next state (step 192).

criteria are satisfied, the sending process can utilize the reordering optimization procedure of the present invention. The reordering optimization procedure reorders the send operations so as to make the one reliable send operation the first send operation and also converts all the following intermediate states into final states. FIGS. 9A and 9B show such an example of a sequence of send

TABLE 2
PSEUDOCODE FOR COMMON JOURNAL OPTIMIZATION

Receive Message at Receiving Process:
```
{
    If Received Message has Attached Timestamp (i.e., ≠ 0) and Message is
    from a Process that shares a Common Journal with Receiving Process
    {
        Set MaxTimestamp = Max(Attached Timestamp, MaxTimestamp)
    }
    Do Normal Processing of Received Message.
    If Received Message Resolves Pending Condition
    (i.e., Enables a State Transition to the Next State of Receiving Process)
    {
        If Next State is an Intermediate State or a Final State entered after
        an Intermediate State (i.e., journalling of Next State is required)
        {
            Spool Next State Information to Journal
            Set MaxTimestamp to Current Timestamp
        }
        Go to Next State.
    }
}
```
Send Message to a Receiving Process:
```
{
    If Next State is an Intermediate State or a Final State entered after an
    Intermediate State (i.e., journalling of Next State is required)
    {
        Spool Next State Information to Journal the Next State.
        MaxTimestamp = Current Timestamp from Journalling Process
    }
    If Transition Event = Reliable Send
    {
        Spool to Journal the Next State and Message.
        MaxTimestamp = Current Timestamp from Journalling Process
    }
    If Receiving Process does not share a Common Journal with Sending
    Process
    {
        Wait until Journal's current Timestamp ≧ MaxTimestamp.
        Clear MaxTimestamp -- Set MaxTimestamp to zero.
    }
    Attach MaxTimestamp to Message.
        -- Attached Timestamp is equal to zero for messages sent to process
           that does not share Common Journal.
    Send Message.
    Go to Next State.
}
```

As described above, whenever a message is sent to another process in the same "domain" as the sending process (i.e., which shares a common journal), the use of asynchronous journalling significantly speeds up the operation of the sending process by avoiding the need to wait for the journal to confirm or acknowledge storage of the next state information on stable storage.

Reordering Message Sequences To Avoid or Minimize Journalling

The "message reordering" journalling optimization technique is applicable when an application process is in a state that meets the following requirements: (A) all subsequent actions by the process prior to reaching a final state are send operations, only one of which is a reliable send operation, and (B) the send operations can be reordered without adversely affecting the distributed computation. An example of when send operations can be re-ordered is when a process "broadcasts" messages which carry the same information to several participants of a distributed computation. If the above listed and reliable send operations before and after reordering, respectively, and the resulting changes in the classification of the process states $S_{j+1}$, $S_{j+2}$ from intermediate to final states.

If the application's state prior to the sequence of send operations is a final state, the application process does not journal the reliable send operation and its subsequent state. Rather, the application process just waits for the reliably sent message to be acknowledged, and then continues with the remaining unreliable send operations. This run-time optimization eliminates all the journalling associated with the intermediate states after the final state and also eliminates the need to journal the one reliably sent message. The one reliably sent message does not need to be journalled because (A) if the process fails before the message is acknowledged, the process will be recovered in the prior final state and the process will terminate immediately, and (B) if the message is acknowledged then any external action taken based on that message will have been durably stored by its recipient.

If the application's state prior to the sequence of send operations is an intermediate state, the subsequent state (which will be a final state due to the reordering of the send operations) needs to be journalled, but it may be journalled asynchronously. See the discussion of the "unique subsequent sequence" optimization technique, below.

More particularly, the application process can execute the remaining unreliable send operations prior to journalling the final state and without waiting for the reliably sent message to be acknowledged, but the application process must not initiate journalling of the subsequent final state (i.e., the first final state entered after the intermediate state) until the reliably sent message has been acknowledged. This wait is required to ensure that the same sequence of messages would be generated upon recovery of the process if the process fails before the final state is journalled.

Finally, asynchronous journalling of the subsequent final state of the application process is sufficient to ensure proper recovery in the event of a failure of either the journal or the application process and is sufficient to ensure proper serialization of the external actions performed by the distributed computation.

The "message reordering" optimization procedure of the present invention is most beneficial when the state at the beginning of the sequence of send operations is a final state, because in that circumstance all journalling operations are avoided.

A second embodiment of this reordering optimization technique is as follows. If after entering any state of a process, all subsequent operations prior to termination of the process are known to be reorderable send operations and at least one of those send operations is an unreliable send operation, then reorder the send operations so that the reliable send operations are performed first and the unreliable send operations are performed last, and so that all states left and/or entered by way of an unreliable send operation are converted into final states. Even if more than one reliable send operation is involved, the number of journalling actions required to complete the application process will generally be reduced.

Guaranteed Receive Operation Optimization

This is a run-time version of the part of the above-described protocol analysis that converts an intermediate state into a final state if all its state transitions are receive operations leading to final states. In particular, if an intermediate state is entered, and if it is known (e.g., based on other state information or based on information in a previously received message) that the only state transition which will occur for this state is a reliable receive operation (which is guaranteed to occur) leading to a final state, then the intermediate state is treated as a final state and thus the next state after the current state is not journalled. Note that in this circumstance, the state machine's process can immediately terminate from the intermediate state because an outside observer will be unable to determine when the state machine's process terminated. This optimization technique utilizes information on the how a particular application works and must be custom tailored for each application process. However, every intermediate state having a reliable receive operation state transition leading to a final state is a potential candidate for this optimization.

The Unique Subsequent Sequence And Delayed Acknowledgements Optimizations

The basis of this optimization is treating a fixed set of states and state transitions as a single unit, where the entire sequence will have to be repeated if there is a failure between execution of the first and last of those states.

Figure 10:
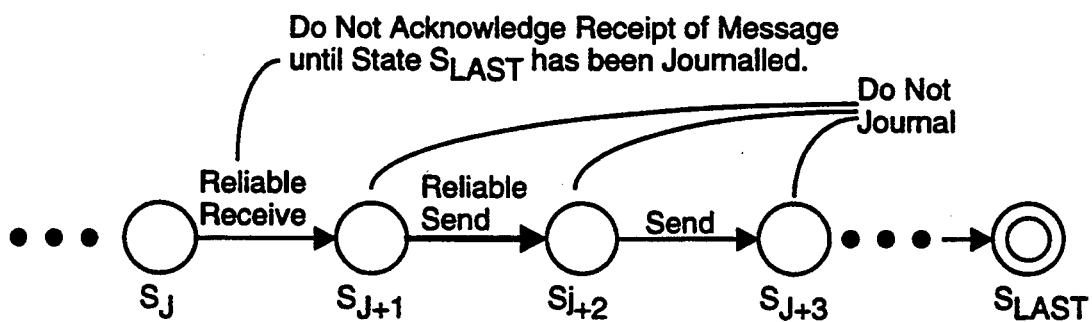
FIG. 10 schematically represents an optimization technique for avoiding journalling of all but the first and last of a sequence of states.

FIG. 10 represents a portion of an application process that has a fixed sequence of states $S_j \rightarrow S_{j+1} \rightarrow \ldots \rightarrow S_{LAST}$ starting with an intermediate state. In a first preferred embodiment, the sequence of states must have no conditional branches. All state transitions after $S_j$ can be executed without journalling, except for journalling of the last state $S_{LAST}$, if (A) the last state is journalled only after all acknowledgements of reliably sent messages have been received, and (B) all acknowledgements of reliably received messages are sent after the last state $S_{LAST}$ has been journalled. Thus, the last state $S_{LAST}$ is journalled asynchronously with respect to the messages sent between the application processes.

Since both the first and last states $S_j$ and $S_{LAST}$ are journalled, the sequence is re-executed in the presence of a failure as long as necessary to ensure that all of the reliably sent messages are received. If the application process fails in the middle of this sequence of operations, it will be restarted in the state $S_1$ at the beginning of the sequence. The sequence of actions is guaranteed to eventually be completed because reliably sent messages are guaranteed to be resent until acknowledged.

This optimization technique is most often applicable when a reliable receive operation following an intermediate state enables a fixed sequence or set of send operations, followed by termination of the application process. One or more journal operations are avoided, thereby making execution of the distributed computation more efficient.

This optimization technique is also frequently applicable to sequences of state transitions that involve no receive operations.

In a second embodiment of this journalling optimization technique, the set of states can have mutually exclusive conditional branches, and all the states in a "terminal subtree of states" of the application process are treated as a unit. However, this optimization is applicable only if the application process is defined so that sequence of events after state $S_j$ (which has been journalled) will be the same during the initial execution of the process and after recovery of the process if a failure occurs. This "unique sequence" requirement may be implemented by ensuring that all potentially different sequences of events are mutually exclusive, or otherwise ensuring that sufficient information is journalled prior to the sequence to ensure that the subsequent sequence of events will not vary if the process is recovered and re-executed after a failure.

If the terminal subtree begins with a reliable receive operation followed only by reliable send and unreliable send operations, the branch of the terminal subtree used in each execution of the process will typically be determined by events prior to entry of the process into the terminal subtree, and thus only a single sequence of state transitions will be enabled for each execution of the process. Thus, in most cases, the second embodiment of this optimization procedure is equivalent to the first preferred embodiment.

To review what has been discussed above, a primary set of journalling criteria are used to determine what state information concerning an application process needs to be journalled and when the journalling actions need to occur. These are the basic journalling criteria required for correct recovery of failed application processes, although optimized to minimize the number of intermediate states in each application process. In accordance with the present invention, some of these primary journalling criteria are superceded by a first set of optimization criteria that define when certain information can be journalled asynchronously. A second set of optimization criteria determine when journalling of certain state information can avoided altogether, most often by applying a message reordering journalling optimization.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system executing application processes that interactively perform a distributed computation, a method performed by said computer system of executing the distributed computation, the method comprising:
   identifying, using a first set of journalling criteria, for each application process first states of said application process that require journalling of state information and events causing a transition from one of said first states to another state of said application process, said first set of journalling criteria providing criteria for synchronous journalling wherein a message is sent to indicate a transition into an intermediate state after receiving confirmation that said journalling has been successfully completed.
   identifying, while executing each application process, and using a second set of journalling criteria that supersede said first set of journalling criteria, second states of each application process that can be journalled asynchronously and events enabling transitions between ones of said states that can be journalled asynchronously, said second set of journalling criteria utilizing state and event information determined during said executing; and
   synchronously journalling, while executing each application process, said first states of said application process which have not been determined as being one of said second states; and asynchronously journalling said second states of said application process.

2. The method of claim 1 further comprising:
   identifying while executing each application process a sequence of states using predefined criteria, said sequence comprising a first state and a last state and said predefined criteria specifying when journalling may be avoided for all other states of said sequence; and
   journalling while executing said application process only said first and last states of said identified sequence of states.

3. The method of claim 2 wherein said sequence of states includes at least one state transition enabled by reliably sending a message, and the method further includes delaying journalling of said last state until receipt of said reliably sent message has been acknowledged by its recipient.

4. The method of claim 3
   wherein said sequence of states includes at least one state transition caused by receiving a reliably sent message from another application process, and the method further includes delaying sending an acknowledgement of receiving said reliably sent message to said other application until said last state has been journalled.

5. In a computer system executing processes that interactively perform a distributed computation, a method performed by said computer system of executing the distributed computation, the method comprising:
   identifying using a first set of journalling criteria, for each application process first states of said application process that require journalling of state information and events causing a transition from one of said first states to another state of said application process, said first set of journalling criteria providing criteria for synchronous journalling wherein a message is sent to indicate a transition into an intermediate state after receiving confirmation that said journalling has been successfully completed
   identifying, while executing each application, using a second set of journalling criteria that supersede said first set of journalling criteria, a sequence of states starting with a first final state and having only one state transition enabled by a reliable send operation and ending in a second final state, said second set of journalling criteria utilizing state and event information to identify said sequence of states that may be reordered to avoid journalling;
   reordering, while executing each application process, said sequence of states to produce a reordered sequence of states such that said reliable send operation is executed first and other state transition events are executed later, and when executing said reordered sequence of states avoiding journalling of states and state transitions which follow said first identified final state in said reordered sequence, and delaying execution of said other state transition events until said one reliable send operation is acknowledged by a recipient.

6. The method of claim 1, wherein each state of said sequence of states of each application process is one of an initial state representing a start state of said application process, an intermediate state representing a state from which said application process is unable to terminate its execution, or a final state representing a state from which said application process is able to terminate its execution.

7. The method of claim 6, wherein said first set of journalling criteria comprises journalling to stable storage intermediate state information, final state information for a first final state entered after a sequence of intermediate states, and a message used for process communication prior to being sent if said message is sent repeatedly until a receiver process has acknowledged receipt of said message.

8. The method of claim 1, wherein each of said events causing a transition comprises one of receiving a message, reliably sending a message until received by another process, or unreliably sending a message which is not guaranteed to be received by another process.

9. The method of claim 1, wherein a first of said application processes shares a common journal with another of said application processes, and said first of said application processes uses asynchronous journalling.

10. The method of claim 2, wherein said sequence of states contains no conditional branches from a state belonging to said sequence.

11. The method of claim 2, wherein said predefined criteria uses runtime information obtained during said executing to determine when journalling may be avoided.

12. The method of claim 5, wherein said second set of journalling criteria uses runtime information obtained during said executing to identify said sequence of states that may be reordered to avoid journalling.

* * * * *